May 13, 1947.                F. NETTEL ET AL                    2,420,335
            MULTIPLE TEMPERATURE AIR SUPPLY ARRANGEMENT
                   FOR HOT AIR POWER PLANT FURNACES
                    Filed Sept. 6, 1944           2 Sheets-Sheet 1

INVENTORS
Frederick Nettel.
Johann Kreitner

INVENTORS
Frederick Nettel.
Johann Kreitner

Patented May 13, 1947

2,420,335

UNITED STATES PATENT OFFICE 2,420,335

MULTIPLE TEMPERATURE AIR SUPPLY ARRANGEMENT FOR HOT AIR POWER PLANT FURNACES

Frederick Nettel, Manhasset, and Johann Kreitner, New York, N. Y.

Application September 6, 1944, Serial No. 553,132

1 Claim. (Cl. 60—59)

This invention deals with the fueling of air expansion power systems of the continuous heating type where power is produced by the expansion of compressed and heated air.

Reference is made to our co-pending application Ser. No. 401,703 filed July 10, 1941, where means for fueling such plants have been disclosed, which application has matured into Patent No. 2,394,253.

The broad aim of this invention is to materially improve the method and means for fueling power systems of the specified kind.

In the art of expansion power systems using open, closed or semi-closed cycles it is known to use the expanded air issuing from an expansion machine as combustion air in a furnace in which the compressed air is heated by heat transfer through surfaces prior to its entrance to the expansion machine.

As fuel burning devices, grates and stokers have been proposed as well as devices for burning fuel in pulverized form. Solid fuels of any kind such as coal, coke, lignite, wood, peat and the like as well as liquid or semi-liquid fuels of the lowest grades such as tar, pitch and asphalt have been envisaged for utilization in the furnace.

With recent developments in air turbine plants, especially with the rise in top temperatures adopted, the temperatures of the air issuing from such air turbines has increased materially, making its use for grates impossible for mechanical, metallurgical and maintenance reasons. Even in pulverized fuel burning devices such very hot air is not always acceptable for several reasons which will be explained in more detail as this specification proceeds.

It is the basic object of this invention to avoid these defects and to permit solid fuels or lowest grade liquid fuels to be utilized in the specified plants efficiently and economically in a simple manner.

It is a further object of this invention to supply the combustion air to the furnace in which the fuel is burned at two or more different temperatures selected to suit the design and operation characteristics of the fuel burning devices used, such as grates, stokers, pulverized coal burners and mills.

It is a specific object of this invention to increase the output and efficiency of grates or stokers of a given size.

It is a further specific object of this invention to provide means for changing the temperature of one or more branch streams of combustion air with varying operating conditions of the power systems.

In the accompanying drawings forming part of this specification there are illustrated diagrammatically embodiments of apparatus suitable for carrying the invention into effect, such embodiments being described in the ensuing portion of the specification.

Figure 1:
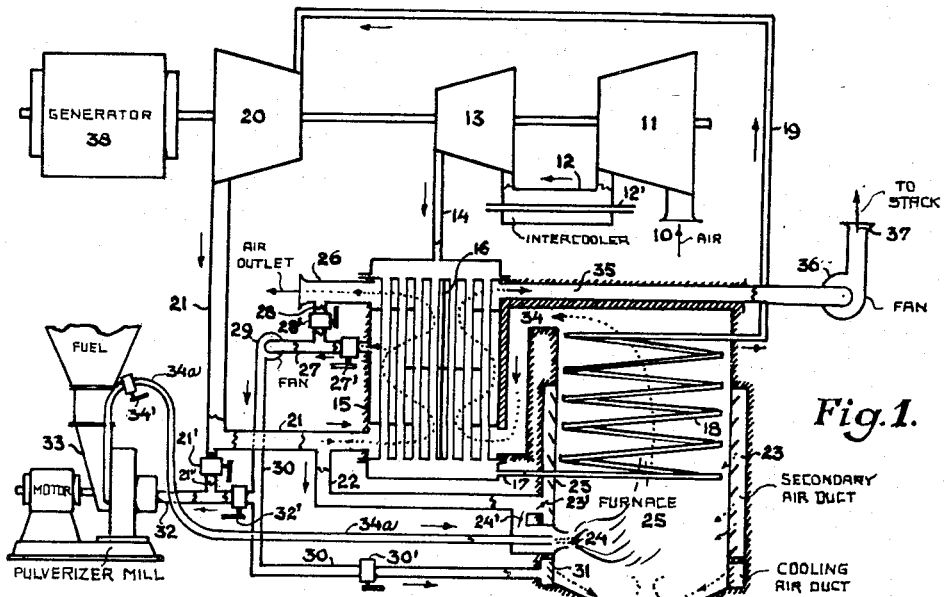
Fig. 1 represents an air turbine power plant for electric power generation for utilizing pulverized coal.

Broadly, in plants according to this invention air is taken from the ambient atmosphere into a compressor, compressed therein, heated thereafter by surface heat transfer in a fuel burning heater, expanded in an expansion machine of any known kind for producing mechanical power. The essence of this invention lies in the characteristic way in which the expanded air issuing from the expansion machine is utilized for heating the compressed air prior to its entrance to said expansion machine. Said compressed air is heated basically in counterflow by two streams flowing through the heating side of said surface heater. One of these streams originates in a fuel burning furnace from which very hot combustion gases flow in heat transfer relation to the compressed air, leaving thereafter to the atmosphere. The other stream is formed by the expanded air from the expansion machine and is brought into heat transfer relation with the compressed air at a point in said heater where said combustion gases have by heat transfer reached substantially its temperature. From this point, to the outlet from the surface heater, both heating streams flow substantially in parallel, mixed or separated by a wall, in heat transfer relation to the compressed air, to be finally rejected to the atmosphere. The combustion air for said furnace chamber is according to this invention furnished by air branched off at at least two different points along the heat transfer path of said expanded air through said surface heater. Said heat transfer path, for the purposes of this invention, includes the conduits for the expanded air leading to and from the surface heater.

This invention discloses further improvements for the utilization of solid fuels on grates or stokers of any kind in air expansion power systems based on following considerations:

In said systems warm combustion air can be made economically available at any temperature or temperatures from the expansion machine exhaust temperature downwards to the temperature at which the expanded air leaves the surface heater. This is done, as described before, by branching off said combustion air at two or more different points along the heat transfer path of the expanded air through the surface heater.

Modern grates or stokers, even those of the compartment type, use forced draft air up to about 200 deg. C. preheated in an air heater. Where over-fire (secondary) air is employed it is usually taken from the same source. Such arrangements do not permit high burning rates (lbs. fuel per sq. ft. grate surface) and their efficiency is not satisfactory with certain kinds of coal, particularly with coals of considerable moisture content. In such known devices generally the first third or even more of the grate surface is required to dry the coal layer and to drive out some volatile matter before full combustion of the coal is started. Thereafter the coal layer moves into a zone where its temperature rises very fast, to drop shortly before the grate carries the slag or ash out of the furnace proper. Simultaneously with the temperature of the coal layer the temperature of the grate or stoker parts in contact with it, or exposed to intense radiation from the flame, reaches a maximum in the center part of the grate, and it is this maximum which determines the useful life of the grate or stoker. In short, the first part of the grate or stoker is generally kept too cold in order not to overheat the part where the main combustion takes place. Details of how this invention provides in a simple and economic manner combustion air streams of different temperatures for the stoker compartments and over-fire air will be described as this specification proceeds.

In expansion power systems employing pulverized coal firing, it is generally advantageous to use air of the highest available temperature, i. e. that branched off immediately behind the exit from the expansion machine, as combustion air. In practice, however, the use of such air is restricted to a portion only of the total air required, namely the secondary air. The primary air is mostly also used for drying of the coal in the mill, entering the furnace chamber (wholly or partly) together with the coal powder for which it serves as carrier medium. The temperature of the primary air has thus to be chosen with due consideration to the nature of the coal, its moisture, volatile content, the type of the pulverizer mill and of the burner. Also safety considerations (explosions in the coal dust system) often limit the air temperature at the pulverizer mill intake.

Details of how this invention solves supply of combustion air in pulverized fuel burning plants will be described as this specification proceeds.

In the specified air expansion power systems the temperature of the expanded air leaving the surface heater tends to drop with the load. Under certain conditions, or with fuel of increased moisture content, the air branched off for a certain purpose, for example for coal drying, may become too cold to fulfill this purpose. The present invention avoids this defect by providing means to change the brancing off point, even during operation, from one point to another, or simultaneously to two different points along the heat transfer path of the expanded air in the system.

Difficulties are also known to arise in dry-bottom pulverized coal furnaces from slag accumulation unless provision is made for cooling of the slag particles while in suspension. In steam boilers it is common practice to provide water tubes disposed near the bottom of the furnace chamber for cooling the falling slag particles before they reach the ash hopper. The slag thus reaches the hopper in granular form for easy removal. In air expansion power systems according to this invention the furnace bottom can be kept cool by blowing across it, or along the surface of the ash hopper, a portion of the combustion air branched off the expanded air stream at a point behind the surface heater, i. e. comparatively cool air. Since this does not materially affect the furnace temperature in the path of the flame, combustion efficiency is maintained. The amount and temperature of the cooling air, of course, depends on the nature of the coal.

According to this invention it is not necessary to lead the expanded air and the combustion gases from the furnace separately through the surface heater. If these two streams are joined their mixture still contains ample free oxygen to be used as combustion supporting medium in the furnace. In the drawings (Fig. 3) such an arrangement is illustrated for pulverized coal firing in which the secondary air is branched off behind an air turbine, while the combustion supporting medium, a mixture of expanded air and combustion gas serving as primary "air," is branched off from a point within the surface heater or behind it. The combustion gases from the furnace join with the stream of expanded air from the turbine at a point where these gases have by heat transfer to the compressed air reached substantially the temperature of the air issuing from the turbine.

In the arrangement as per Fig. 1 the power cycle operates as follows: Air at 10 is taken into compressor 11, passes through intercooler 12, equipped with pipe system 12' for the cooling medium, thence into compressor 13, out via pipe 14 into secondary surface heater 15. A wall 16 divides the heating side of that heater into two separate passages, the purpose of which will be described later. The compressed air leaves 15 through pipe 17 to flow through the primary surface heater (coil) 18 disposed in the furnace 25, and thence through pipe 19 to the inlet of air turbine 20 where it expands while producing power to drive the compressors 11 and 13 and the electric generator 38. Heater 15 has, as mentioned before, two passages on the heating side. The left hand passage is for the expanded air from turbine 20, for which purpose pipe 21 connects the turbine outlet with the secondary heater. The expanded air flows upwards in said heater, being offered two possible outlets, one through pipe 27, the other at 26 to the atmosphere. Pipe 27 is connected via valve 27' to the suction side of fan 29. A connection between pipes 26 and 27 is provided by pipe 28 with valve 28'. Fan 28 discharges into pipe 30, equipped with valve 30' which leads to the cooling air ducts at the lower end of end of the furnace 25. Pipe 32 branches off from 30 and connects it via valve 32' with pulverizer mill 33. A connection between 21 and 32 is established by pipe 21'' via valve 21'. Another branch pipe from 21, pipe 22 connects via flap valves 23' and 24' to the secondary air ducts 23 in the furnace 25 of the primary heater and to the burner 24 for puverized fuel. 34 is the outlet from the furnace connected, as shown, to the right hand passage for combustion gases in the secondary heater 15 and to the exit passage 35 leading to fan 36 and thence to the stack at 37. Pipe 34a, with valve 34' serves for the mixture of fuel powder and primary air which it carries to burner 24.

When burning coal of a certain character the plant operates as follows: Valves 28' and 21' closed. Hot air flows directly from the turbine outlet 21 via 22 to the ducts 23 in the furnace 25. Somewhat colder air is taken from the secondary heater 15 via pipe 27, i. e. at a point where the expanded air has by heat transfer to the compressed air flowing through the tube system of the secondary heater reached a lower temperature. A portion of this air flows to the cooling air ducts 31 at the bottom of the furnace where it assists in cooling the ash and slag before it reaches the ash hopper, while the remainder enters the pulverizer mill 33 via 32 and valve 32'. This air is used to dry the coal in the mill and finally as carrier air to transport the coal powder through pipe 34a into the burner 24. By proper selection of the position of the branching off point for the drying air through pipe 27, the air temperature can be chosen so as to be sufficient for the purpose, but not too high to create danger in the mill and coal dust pipes.

If under certain load condition, or with changing character of the fuel (moisture content etc.) the temperature in pipe 32 should become too high, valve 28' is opened and cooler air from 26 is mixed with that in pipe 27 thus reducing the air temperature in 32 to a permissible level. It is of course also possible to close pipe 27 altogether by shutting valve 27' and draw all air for the pulverizer from 26.

With very wet coal, for example, it might be desired to increase the temperature of the drying air in 32 beyond what is possible when air is taken from pipe 27. In that case valve 21' is opened, permitting hot air from 21 to mix with the air from 27; in extreme cases valve 32' might be closed altogether and all air for the mill drawn from pipe 21.

The advantage of using combustion air of different temperatures supplied according to this invention becomes thus obvious.

Figure 2:
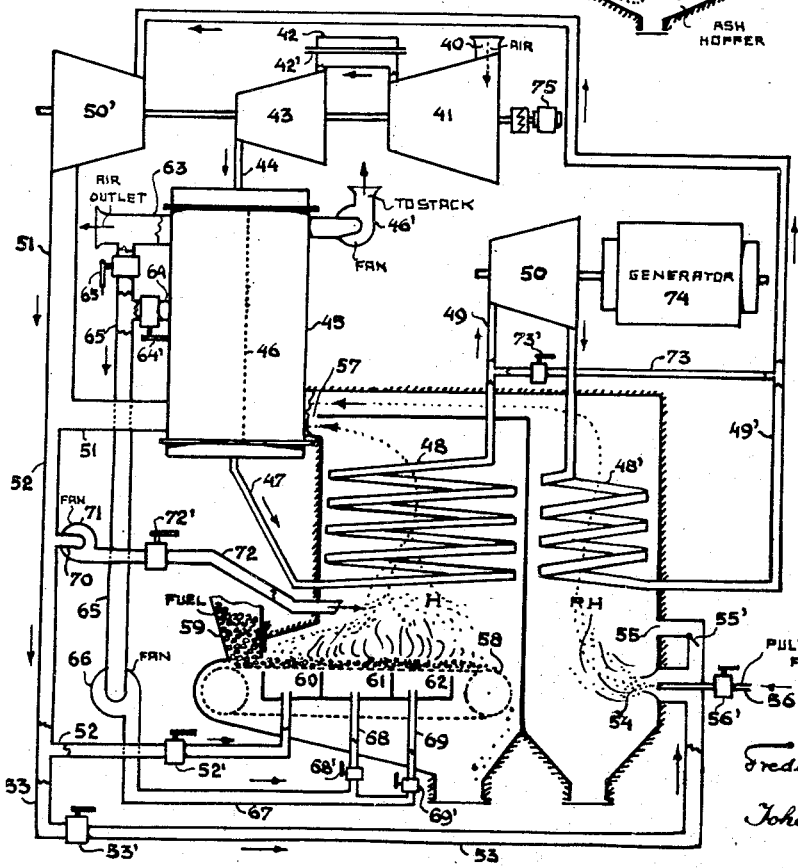
Fig. 2 shows an alternative embodiment for a plant employing intercooling and reheating of the working air, and for burning part of the fuel on a grate, while the remainder is burned in pulverized form.

Fig. 2 shows an alternative embodiment of the invention for an air expansion power system with two stage compressors with interposed cooler, primary heater furnace with travelling grate for fuel in bulk, and reheater furnace with pulverized firing.

The power cycle operates as follows: Air at 40 is taken into compressor 41, passes through intercooler 42, equipped with pipe system 42' for the cooling medium, thence to the compressor 43, out via pipe 44 into secondary heater 45 with dividing wall 46. This heater is of the same design as shown in Fig. 1. The compressed air leaves 45 through pipe 47 to flow through primary heater coil 48 disposed in the furnace H, and thence through pipe 49 into turbine 50 where it expands partially while producing power to drive the electric generator 74. From 50 the air flows through a secondary primary heater coil 48' disposed within the reheater furnace RH and enters turbine 50' via pipe 49'. In 50' the air expands to near atmospheric pressure while producing power to drive compressors 41 and 43 and leaves through pipe 51, which is connected to the secondary heater 45 in the same manner as pipe 21 is in Fig. 1. Branched off from 51 is pipe 52 which via valve 52' is connected to the first compartment 60 of travelling grate stoker 58; another branch pipe 70 connects with fan 71 from which pipe 72 with valve 72' leads to the furnace H above the grate 58. A third branch 53 leads via valve 53' to pulverized fuel burner 54 and secondary air inlet to the reheat furnace RH. 55 is a duct with flap valve 55' for secondary air branched off pipe 53. 56 is a pipe with valve 56' for the mixture of pulverized fuel and primary air. 59 is the fuel hopper supplying fuel to the grate 58. Pipes 64 and 65 with valves 64' and 65' correspond to the equivalent parts 27, 28 and 27', 28' in Fig. 1 and serve the same purpose. Pipe 65 connects to the suction side of fan 66 which discharges into pipe 67, from which latter pipe branch pipe 68 with valve 68' and pipe 69 with valve 69' lead to compartments 61 and 62 of grate 58 respectively. The combustion gases from furnaces H and RH enter the secondary heater 45 at 57 to pass through the right hand passage as in Fig. 1, and out stack via fan 46'. Pipe 73 with valve 73' forms a cross connection between pipe 49 and 49', short circuiting turbine 50 and heating coil 48' when valve 73' is opened. This is advantageous during starting and at very low loads when the reheat chamber RH with burner 54 is put out of action altogether. 75 is a motor of any kind for starting the set 41, 43, 50'.

As is clear from the drawing, the combustion air is being supplied in the following manner:

First compartment 60 very hot air from pipe 51. Second and third compartments 61 and 62 colder air either from pipe 64 or from 63, or a mixed supply from both pipes. Over-fire air in furnace H through pipe 72 directly fed from pipe 51 i. e. very hot. Burner and secondary air supplied for reheat furnace RH directly from pipe 51 and 52 respectively i. e. very hot. In Fig. 2 the source of the pulverized fuel (the mill) and of the primary air is not shown but it is evident that this can be done in the same manner as shown for pulverized fuel in Fig. 1.

Figures 3, 4:
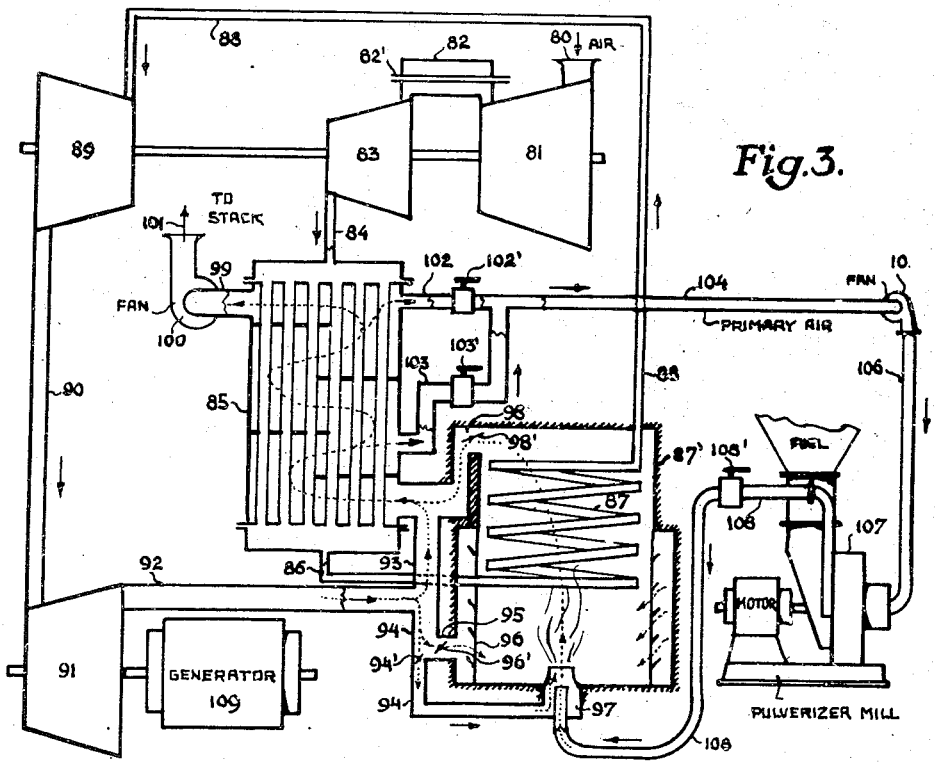
Fig. 3 shows another embodiment using admixture of combustion gases to the expanded air.
Fig. 4 is a modification of arrangement according to Fig. 3.

In Fig. 3 the power cycle operates as follows: Air at 80 is taken into compressor 91, passes through intercooler 82 equipped with pipe system 82' for the cooling medium, thence into compressor 83, out via pipe 84 into secondary surface heater 85 leaving it through pipe 86 to flow through primary heater coil 87 disposed in the furnace 87' and thence through pipe 88 to the inlet of the air turbine 89 where it expands partially while developing power to drive compressors 81 and 83. The partially expanded air passes through pipe 90 to air turbine 91 where it expands to near atmospheric while developing power to drive electric generator 109. The expanded air continues through pipes 92 and 93 to the entrance of the heating side of the secondary heater 85 through which it flows as indicated by the dotted line and out through pipe 99, fan 100 and to the atmosphere at 101. Branching off from pipe 92 is pipe 94 leading via flap valve 94' to the burner for pulverized coal 97. Another branch from 94 is pipe 95 with flap valve 96' which leads to the ducts 96 surrounding furnace chamber 87'. The outlet duct from 87' with flap valve 98' joins with pipe 93 at the entrance to the secondary heater 85. Two outlets are provided from the heating side of the secondary heater, namely pipe 103 with valve 103' and pipe 102 with valve 102', both of which join up with the suction pipe 104 to fan 105a which discharges via pipe 106 to the pulverizer mill 107. From that mill pipe 108 for the mixture of primary air and coal powder connects with burner 97. In this arrangement the combustion air is supplied as follows: Secondary air is branched off immediately behind turbine 91 through pipes 94 and 95. Tertiary air to the burner is also furnished through pipe 94. Primary air which is used for coal drying in the mill is branched off either through pipe 103 or pipe 102, or through both these pipes simultaneously, being sucked by fan 105 through pipe 104 and delivered to mill 107 via pipe 106. The mixture of primary air and coal powder is blown into the burner via pipe 108 with valve 108'. It is obvious that the secondary air is hotter than the primary air. By operating valves 102' and 103' the temperature of the primary air can be adjusted to meet drying requirements in the pulverizer mill.

Fig. 4 shows a different arrangement of pipes applicable to plant as per Fig. 3. It will be seen that the primary air supplied to pipe 104 is in this case branched off at 105 via valve 105', i. e. within the secondary heater, and through pipe 106 with valve 106', at a point where the gases from the furnace coming through duct 98 have already been mixed with the air coming from turbine 91 via pipe 92 and 93. In this case the primary air can be adjusted within a higher temperature range than is the case in the arrangement of Fig. 3.

While the alternative arrangements for either leading the air through the secondary heater separately or mixed are feasible, the first mentioned one is the preferred arrangement since the stack has in this case to be designed for a smaller quantity of gases, and because the clean waste air, which is still warm, may be used for room heating, preliminary coal drying and similar other purposes.

It is immaterial for this invention what types of compressors or turbines are used, whether the turbine are arranged in series or parallel as regards the flow of the working air, whether or not intercooling and/or reheating is employed, and what types of intercoolers or reheaters are used; it is further immaterial what kind of power consuming device is driven by the expansion machine or whether the power system serves to supply compressed air instead of mechanical power.

While preferred embodiments of the invention have been illustrated by way of example, it is to be understood that the invention is not limited in its scope to the embodiments shown but may be embodied in other forms of apparatus which may or may not employ certain characteristic features of the invention to the exclusion of others.

What we claim is:

In an air expansion power system of the continuous combustion type including conduit means to take in a continuous stream of air from the atmosphere, means to compress it, means to expand it for developing power, conduit means including heat exchange surfaces connecting the outlet of said compressing means to the inlet of said expansion means, conduit means including heat exchange surfaces connecting the outlet of said expansion means to the atmosphere, said third conduit means being arranged in heat exchange relation to said second conduit means, a fuel burning furnace adapted for simultaneously using a plurality of combustion air streams of different temperatures, conduit means including heat exchange surface leading the combustion gases from said furnace to the atmosphere, said fourth conduit means being also arranged in heat exchange relation to said second conduit means, means for branching part streams off said third conduit means in a plurality of points along its heat transfer path, and conduit means connecting said branch points to said furnace for simultaneously supplying a plurality of combustion air streams of different temperatures.

FREDERICK NETTEL.
JOHANN KREITNER.